United States Patent
Okuyama

(10) Patent No.: US 11,123,912 B2
(45) Date of Patent: Sep. 21, 2021

(54) CONTAINER MANUFACTURING METHOD AND PREFORM

(71) Applicant: Yuichi Okuyama, Tokyo (JP)

(72) Inventor: Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 66 days.

(21) Appl. No.: 15/780,738

(22) PCT Filed: Oct. 17, 2016

(86) PCT No.: PCT/JP2016/080738
§ 371 (c)(1),
(2) Date: Jun. 1, 2018

(87) PCT Pub. No.: WO2017/104250
PCT Pub. Date: Jun. 22, 2017

(65) Prior Publication Data
US 2018/0354186 A1    Dec. 13, 2018

(30) Foreign Application Priority Data

Dec. 17, 2015 (JP) .............................. JP2015-246511

(51) Int. Cl.
*B29C 49/22* (2006.01)
*B29C 49/00* (2006.01)
(Continued)

(52) U.S. Cl.
CPC .......... *B29C 49/22* (2013.01); *B29C 49/0005* (2013.01); *B29C 49/02* (2013.01);
(Continued)

(58) Field of Classification Search
None
See application file for complete search history.

(56) References Cited

U.S. PATENT DOCUMENTS

| | | | | |
|---|---|---|---|---|
| 4,393,106 A | * | 7/1983 | Maruhashi | ......... B65D 23/0814 |
| | | | | 428/36.7 |
| 4,687,689 A | * | 8/1987 | Yazaki | .................... B32B 27/32 |
| | | | | 428/35.7 |

(Continued)

FOREIGN PATENT DOCUMENTS

| | | |
|---|---|---|
| GB | 1 341 847 A | 12/1973 |
| JP | S49-003073 B1 | 1/1974 |

(Continued)

OTHER PUBLICATIONS

Jun. 25, 2019 Extended Search Report issued in European Patent Application No. 16875235.0.

(Continued)

*Primary Examiner* — Monica A Huson
(74) *Attorney, Agent, or Firm* — Oliff PLC

(57) ABSTRACT

By coating an inner surface of a preform, in which at least an inner surface is made of polyester and which has transparency, with a coating layer, which has elongation capacity and water insolubility, the inner surface of the preform is protected against a pressurized liquid by the coating layer when the pressurized liquid is supplied to the preform, and occurrence of cloudiness on an inner surface of a container after molding is prevented even in a case where a liquid having properties of eroding polyester and causing cloudiness on a polyester surface is used as the pressurized liquid during liquid blow molding.

7 Claims, 2 Drawing Sheets

(51) Int. Cl.
    *B29C 49/02*         (2006.01)
    *B29C 49/46*         (2006.01)
    *B05D 7/22*          (2006.01)
    *B05D 7/02*          (2006.01)
    *B29K 29/00*         (2006.01)
    *B29K 67/00*         (2006.01)
    *B29C 49/04*         (2006.01)
    *B29C 49/06*         (2006.01)
    *B29K 75/00*         (2006.01)
    *B29K 27/06*         (2006.01)
    *B29L 31/00*         (2006.01)

(52) U.S. Cl.
    CPC ............... *B05D 7/02* (2013.01); *B05D 7/227* (2013.01); *B05D 2701/00* (2013.01); *B29C 49/04* (2013.01); *B29C 49/06* (2013.01); *B29C 49/46* (2013.01); *B29C 2049/027* (2013.01); *B29C 2049/4664* (2013.01); *B29K 2027/06* (2013.01); *B29K 2029/00* (2013.01); *B29K 2029/14* (2013.01); *B29K 2067/00* (2013.01); *B29K 2067/003* (2013.01); *B29K 2075/00* (2013.01); *B29K 2995/0026* (2013.01); *B29K 2995/0046* (2013.01); *B29L 2031/7158* (2013.01)

(56) References Cited

U.S. PATENT DOCUMENTS

2005/0220997 A1    10/2005    Kronseder et al.
2007/0066504 A1*   3/2007    Hsu ......................... C11D 1/74
                                                  510/276
2008/0029928 A1*   2/2008    Andison ................ B29C 49/46
                                                  264/238
2015/0158204 A1    6/2015    Kraus

FOREIGN PATENT DOCUMENTS

| JP | S59-29130 A | 2/1984 |
|---|---|---|
| JP | 2001-199421 A | 7/2001 |
| JP | 2005-529002 A | 9/2005 |
| JP | 2005-529220 A | 9/2005 |
| JP | 2009-533290 A | 9/2009 |
| JP | 2012-061463 A | 3/2012 |
| JP | 2013-541448 A | 11/2013 |
| JP | 2015-066921 A | 4/2015 |
| JP | 2015-212083 A | 11/2015 |

OTHER PUBLICATIONS

Jul. 2, 2019 Office Action issued in Japanese Patent Application No. 2015-246511.
Jul. 12, 2019 Office Action issued in Chinese Patent Application No. 201680071598.0.
Dec. 20, 2016 International Search Report issued in International Patent Application No. PCT/JP2016/080738.
Feb. 6, 2020 Office Action issued in Chinese Patent Application No. 201680071598.0.
Jun. 19, 2018 International Preliminary Report on Patentability issued in International Patent Application No. PCT/JP2016/080738.
Dec. 2, 2020 Office Action issued in European Patent Application No. 16875235.0.

* cited by examiner

CONTAINER MANUFACTURING METHOD AND PREFORM

TECHNICAL FIELD

The present disclosure relates to a method of producing a container having a predetermined shape holding therein a content liquid by liquid blow molding a preform in which at least an inner surface is made of polyester and which has transparency, and the present disclosure also relates to the preform used in the method of producing a container.

BACKGROUND

Polyester containers, typical examples of which are polyethylene terephthalate bottles (PET bottles) and polyethylene naphthalate containers, that have transparency (i.e., that are transparent) are used to hold a variety of liquids, such as a beverage, a cosmetic product, a pharmaceutical product, a liquid detergent, a toiletry including shampoo.

Such a container is generally produced by blow molding a preform that has been formed in a substantially test tube shape, that is made of polyester, and that has transparency. As an example of blow molding adopted to mold the preform into the container, liquid blow molding is known. In liquid blow molding, a pressurized liquid, instead of pressurized air, is used as a pressurized medium supplied to the preform.

Patent Literature 1, for example, describes a method of producing a container having a predetermined shape by liquid blow molding a preform made of polyethylene naphthalate, a kind of polyester, by supplying a pressurized liquid to the preform. According to such a method of producing a container that adopts liquid blow molding, since a content liquid to be held in the container as a final product may be used as the liquid supplied to the preform, the process of filling the content liquid to the container after molding may be omitted. Accordingly, the production process, molding, and the configuration of filling line may be simplified.

CITATION LIST

Patent Literature

PTL 1: JP2005529002A

SUMMARY

Technical Problem

To produce a container holding, as the content liquid, a surfactant-containing liquid, such as a liquid detergent and a softener, or an alcohol-containing liquid, such as an alcohol drink, that contains alcohol like ethanol, liquid blow molding is performed by supplying the liquid as the pressurized medium to the polyester preform.

However, liquid blow molding the polyester preform by supplying the surfactant-containing liquid or the alcohol-containing liquid to the polyester preform leads to formation of fine unevenness on an inner surface of the container after molding due to an inner surface of the preform being affected by the surfactant or alcohol at the time of molding. This poses the problem that cloudiness (opaqueness) occurs on the inner surface of the container and that transparency of the container is degraded. This applies not only when a single-layer preform made of polyester alone is liquid blow molded, but also when a preform having a laminated structure in which at least the inner surface is made of polyester is liquid blow molded. Examples of the preform having the laminated structure may include a preform in which the innermost layer is formed as a polyester layer and in which another layer made of a different type of polyester and other resin layers are laminated on the outer side of the innermost layer.

The present disclosure has been conceived in view of the above problem, and the present disclosure is to provide a method of producing a container and a preform that, even when the preform in which at least the inner surface is made of polyester and which has transparency is liquid blow molded by using the surfactant-containing liquid or the alcohol-containing liquid, allow transparency of the container holding the liquid after molding to be maintained.

Solution to Problem

One of aspects of the present disclosure resides in a method of producing a container, including: a preform molding step of molding a preform in which at least an inner surface is made of polyester and which has transparency; a coating step of coating the inner surface of the preform with a coating layer having elongation capacity and water insolubility; and a liquid blow molding step of molding the preform into the container having a predetermined shape by supplying a pressurized liquid into the preform in which the inner surface is coated with the coating layer.

In the presently disclosed method of producing a container that is configured as above, the preform is preferably made of polyethylene terephthalate.

In the presently disclosed method of producing a container that is configured as above, the coating layer is preferably made of polyvinyl butyral.

In the presently disclosed method of producing a container that is configured as above, the coating layer is preferably made of polyvinylidene chloride.

Another aspect of the present disclosure resides in a preform having transparency and configured to be molded into a container having a predetermined shape by liquid blow molding, wherein at least an inner surface of the preform is made of polyester, and the inner surface is coated with a coating layer having elongation capacity and water insolubility.

In the presently disclosed preform configured as above, the preform is preferably made of polyethylene terephthalate.

In the presently disclosed preform configured as above, the coating layer is preferably made of polyvinyl butyral.

In the presently disclosed preform configured as above, the coating layer is preferably made of polyvinylidene chloride.

Advantageous Effect

According to the present disclosure, since the inner surface of the preform in which at least the inner surface is made of polyester and which has transparency is coated with the coating layer having elongation capacity and water insolubility, even when the surfactant-containing liquid or the alcohol-containing liquid is supplied into the preform during liquid blow molding, the coating layer protects the inner surface of the preform against the liquid. Furthermore, since a coating layer having elongation capacity and water insolubility is adopted as the coating layer, the coating layer, together with the preform, is stretched at the time of liquid blow molding, thereby allowing the coating layer to always protect the inner surface of the preform or the container against the liquid. Accordingly, the polyester inner surface of the preform or the container is less affected by the surfactant-containing liquid or the alcohol-containing liquid at the time of liquid blow molding, and therefore, the occurrence of cloudiness (opaqueness) in the container after molding is prevented, and transparency of the container after molding is maintained.

In this way, the present disclosure provides a method of producing a container and a preform that, even when the preform in which at least the inner surface is made of polyester and which has transparency is liquid blow molded by using the surfactant-containing liquid or the alcohol-containing liquid, allow transparency of the container holding the liquid after molding to be maintained.

DETAILED DESCRIPTION

Figure 1:
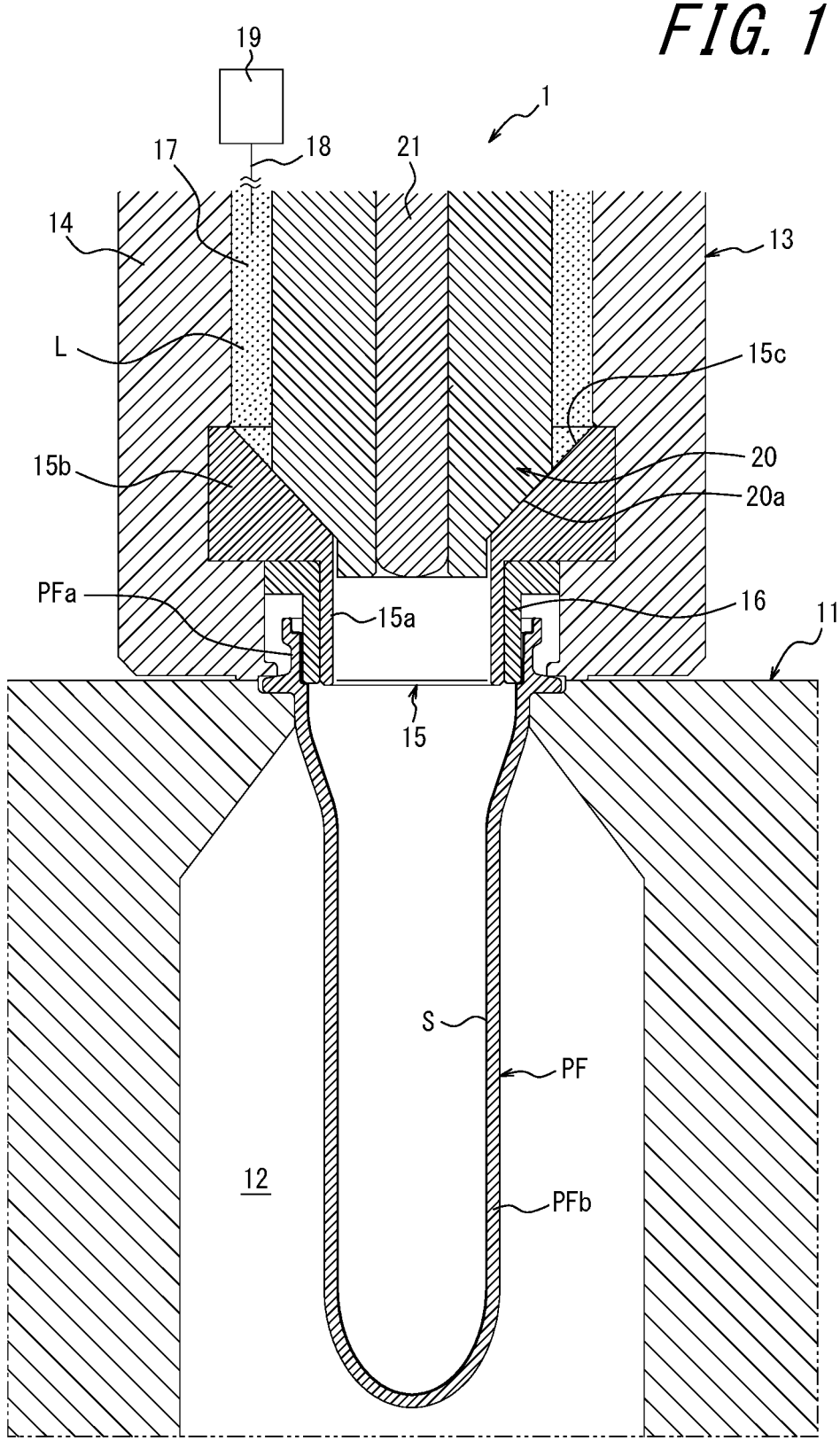
FIG. 1 illustrates a liquid blow molding apparatus used in a method of producing a container according to one of embodiments of the present disclosure.

The following describes the present disclosure in more detail by way of illustration with reference to the drawings.

A method of producing a container according to the present disclosure includes: a preform molding step of molding a preform in which at least an inner surface is made of polyester and which has transparency; a coating step of coating the inner surface of the preform with a coating layer having elongation capacity and water insolubility; and a liquid blow molding step of molding the preform into the container having a predetermined shape by supplying a pressurized liquid into the preform in which the inner surface is coated with the coating layer.

Note that "having transparency" herein means that the liquid (content liquid) held inside the preform and the container is visible from the outside and may encompass a variety of types of transparency, such as being colorless or colored, and transparent or semi-transparent.

In the presently disclosed method of producing a container, the preform molding step is firstly performed. In the preform molding step, the preform PF in which at least the inner surface is made of polyester and which has transparency is molded.

The preform molding step may be configured to mold the preform PF having a predetermined shape by way of injection molding, direct blow molding, extrusion molding, or the like by using polyester (resin) as an ingredient. In this case, as illustrated for example in FIG. 1, the shape of the preform PF may be a substantially tube shape including a cylindrical-shaped mouth PFa and a bottomed tubular-shaped trunk PFb, which is connected to the mouth PFa.

Additionally, the shape of the preform PF, which only needs to be configured to be liquid blow molded to produce the container holding the content liquid, may be altered in various ways.

The preform PF molded in the preform molding step may have a single-layer structure made of, for example, polyethylene terephthalate (PET). In this case, by liquid blow molding the preform PF, the container holding the content liquid may be configured as a so-called PET bottle.

The material of the preform PF is not limited to polyethylene terephthalate, and other polyester materials, such as polyethylene naphthalate (PEN), that have transparency may also be used.

Furthermore, the preform PF only needs to have at least the inner surface which is made of polyester and to have transparency, and the preform PF does not necessarily need to have the single-layer structure. For example, the preform PF may have a laminated structure in which the innermost layer is made of polyester and in which another layer made of a different type of polyester and other resin layers are laminated on the outer side of the innermost layer.

After the preform PF is molded in the preform molding step, the coating step is performed next. In the coating step, the coating layer S is disposed on the inner surface of the preform PF molded in the preform molding step to coat the entire inner surface with the coating layer S.

As the coating layer S, a coating layer having water insolubility, that is, characteristics of being difficult to dissolve in water, and having elongation capacity that allows the coating layer, together with the preform PF, to be stretched in the axial and radial directions at predetermined draw ratios when the preform PF is liquid blow molded into the container is used.

For example, the coating layer S may be made of polyvinyl butyral (PVB). In this case, the coating layer S is preferably configured to be disposed in a laminated manner such that the thin layer-like polyvinyl butyral adheres closely to the entire inner surface of the preform PF.

The coating layer S as described above may be formed, for example, by applying liquid polyvinyl butyral in the form of spray to the entire inner surface of the preform PF, or by applying polyvinyl butyral to the entire inner surface of the preform PF by pouring liquid polyvinyl butyral into the preform PF and subsequently discharging the poured polyvinyl butyral or by immersing the preform PF in liquid polyvinyl butyral, and by subsequently drying the applied polyvinyl butyral. Additionally, a diluted solution may be used as polyvinyl butyral as described above.

The coating layer S is not limited to polyvinyl butyral (PVB), and the coating layer S made of a variety of materials, such as polyvinylidene chloride (PVDC) and polyurethane, that have elongation capacity and water insolubility may also be adopted.

The coating layer S preferably has transparency. However, transparency of the coating layer S is not necessary in the state where the coating layer S is disposed on the inner surface of the preform PF only if the coating layer S gains transparency due to a reduced thickness when the coating layer S, together with the preform PF, is stretched at the time of molding the preform PF into the container.

In this way, the preform PF in which the inner surface is coated with the coating layer S is produced by the preform molding step and the coating step.

Figure 2:
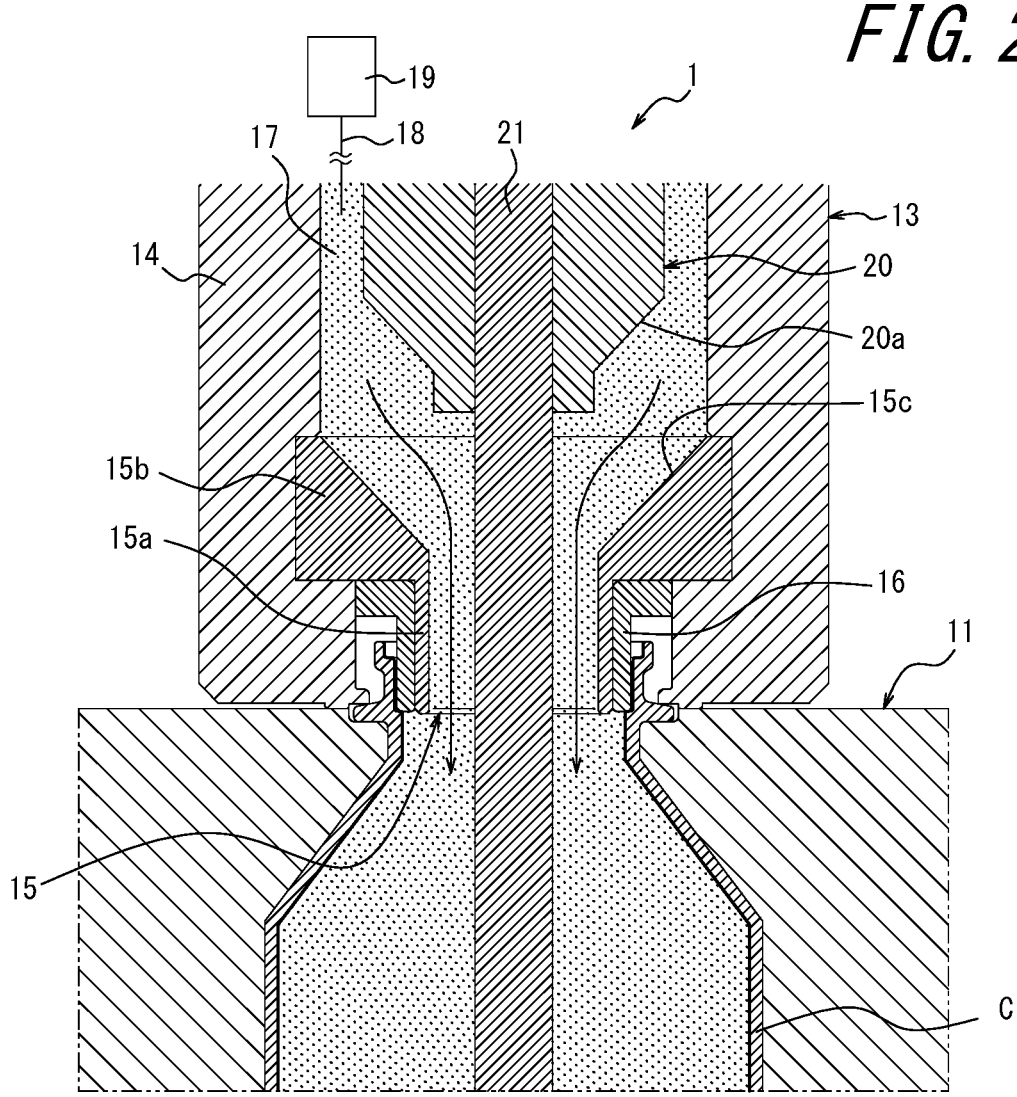
FIG. 2 illustrates how a preform is liquid blow molded.

After the preform PF in which the inner surface is coated with the coating layer S is produced, the liquid blow molding step is performed next. In the liquid blow molding step, as illustrated in FIG. 2, the liquid pressurized to a predetermined pressure, that is, the pressurized liquid L, is supplied into the preform PF to mold the preform PF into the container C having the predetermined shape. The entire inner surface of the container C after molding is coated with the coating layer S, which has been stretched together with the preform PF.

In the liquid blow molding step, a liquid (hereinafter, called the erosive liquid) containing a component, such as an alkaline component, a surfactant, and an alcohol component including ethanol, that, when being contained in the pressurized liquid L at greater than or equal to a predetermined percentage by weight concentration, erodes polyester and causes cloudiness on a polyester surface may be used as the pressurized liquid L. In this case, the erosive liquid may contain any combination of several types of components as mentioned above and may further contain other components, such as a preservative, a colorant, an enzyme, and a perfume. Examples of the erosive liquid may include a liquid detergent, a softener, an alcohol drink, and the like. The embodiment below describes a case where the aforementioned erosive liquid is used as the pressurized liquid L.

The liquid blow molding step may be performed by using a liquid blow molding apparatus 1 as illustrated in FIGS. 1 and 2. The illustrated liquid blow molding apparatus 1 is configured to produce the container C having the predetermined shape holding therein the erosive liquid by liquid blow molding the preform PF in which the inner surface is coated with the coating layer S by using the pressurized liquid L formed by the aforementioned erosive liquid.

The liquid blow molding apparatus 1 includes a mold 11 (hereinafter, called the blow molding mold 11) used for blow molding. The blow molding mold 11 has a cavity 12, whose shape corresponds to the shape of the container C. In the illustrated case, the cavity 12 has a bottle shape and is open upward on an upper surface of the blow molding mold 11. Although not illustrated in detail, the blow molding mold 11 may be opened into left and right mold halves, and the container C after molding may be removed from the blow molding mold 11 by opening the blow molding mold 11.

The preform PF in which the inner surface is coated with the coating layer S is heated in advance to a predetermined temperature at which stretchability may be achieved by using a heater or the like that is not illustrated. Subsequently, the preform PF is disposed in the blow molding mold 11 in an upright position in which the mouth PFa protrudes upward from the cavity 12.

Above the blow molding mold 11, there is provided a nozzle unit 13, which is displaceable in upward and downward directions relative to the blow molding mold 11. The nozzle unit 13 includes a main body block 14 and a blow nozzle 15.

The blow nozzle 15 has an integral structure formed of steel, a resin material, or the like that includes a nozzle main body 15a, which is formed in a cylindrical shape having a diameter smaller than an inner diameter of the mouth PFa of the preform PF, and a large-diameter supporting portion 15b, which is formed integrally with the nozzle main body 15a. The blow nozzle 15 is fixed to the main body block 14, with the supporting portion 15b being fitted in an inner surface of the main body block 14.

The nozzle main body 15a is disposed co-axially with the cavity 12 of the blow molding mold 11 and is configured to engage with the mouth PFa of the preform PF fitted in the blow molding mold 11 when the nozzle unit 13 is displaced downward to a predetermined position. Additionally, reference numeral 16 denotes a sealing body configured to seal between the nozzle main body 15a and the mouth PFa.

The main body block 14 is provided, inside thereof, with a supply path 17, which is disposed co-axially with the nozzle main body 15a and extends vertically. The supply path 17, in a lower end thereof, is connected to the blow nozzle 15.

A pressurized liquid supply unit 19 is connected to the supply path 17 via a pipe 18. The pressurized liquid supply unit 19 is configured to supply the pressurized liquid L pressurized to the predetermined pressure to the supply path 17 via the pipe 18.

Once the pressurized liquid L is supplied from the pressurized liquid supply unit 19 to the supply path 17, the pressurized liquid L is supplied from the supply path 17 into the preform PF disposed in the blow molding mold 11 through the blow nozzle 15. Consequently, the preform PF is liquid blow molded by the pressurized liquid L into the container C having the shape conforming to the cavity 12 of the blow molding mold 11.

As the pressurized liquid supply unit 19, a pressurized liquid supply unit that employs, for example, a plunger pump as a pressurizing source may be used.

A seal pin 20, which is configured to open and close the supply path 17 with respect to the blow nozzle 15, is disposed inside the supply path 17. The seal pin 20 is formed in a columnar shape extending along an axis of the supply path 17 and is configured to be displaceable in the upward and downward directions relative to the main body block 14 inside the supply path 17. On the other hand, a tapered closing surface 15c is provided on an upper surface of the supporting portion 15b of the blow nozzle 15. When the seal pin 20 is displaced to its lowermost stroke end and when a tapered surface 20a, which is provided in a lower end of the seal pin 20, comes into abutment with the closing surface 15c, communication between the supply path 17 and the nozzle main body 15a is blocked by the seal pin 20, and the supply path 17 is in a closed state with respect to the blow nozzle 15. On the other hand, when the seal pin 20 is displaced upward and when the tapered surface 20a, which is provided in the lower end of the seal pin 20, comes off from the closing surface 15c, communication between the supply path 17 and the nozzle main body 15a is established, and the supply path 17 is in a state where the supply path 17 is open to the blow nozzle 15, namely, in an opened state.

Accordingly, by operating the pressurized liquid supply unit 19 in a state where the nozzle main body 15a is engaged with the mouth PFa of the preform PF and where the seal pin 20 is opened to bring the supply path 17 into communication with the blow nozzle 15 as illustrated in FIG. 2, the pressurized liquid L is supplied into the preform PF from the pressurized liquid supply unit 19 via the supply path 17 and the blow nozzle 15 to liquid blow mold the preform PF. As a result of liquid blow molding described above, the container C holding therein the pressurized liquid L, namely, the erosive liquid, is produced.

The liquid blow molding apparatus 1 may be configured to include a stretching rod 21, which is fitted in an insertion hole provided in a middle portion of the seal pin 20 in a manner such that the stretching rod 21 is displaceable. In this case, the stretching rod 21 is displaceable in the upward and downward directions (i.e., the axial direction) relative to the seal pin 20. As illustrated in FIG. 2, by being displaced downward (toward a bottom of the cavity 12) with respect to the seal pin 20, the stretching rod 21 pushes a bottom portion of the trunk PFb of the preform PF disposed in the blow molding mold 11 to stretch the trunk PFb in the axial direction (i.e., the machine direction) inside the cavity 12. That is to say, with the liquid blow molding apparatus 1 configured to include the stretching rod 21, the container C may be produced by biaxial stretch blow molding in which the preform PF disposed in the blow molding mold 11 is stretched in the machine direction with use of the stretching rod 21 and is also stretched in the radial direction with use of the pressurized liquid L.

By thus liquid blow molding the preform PF in which the inner surface is coated with the coating layer S in the liquid blow molding step, the present disclosure allows molding of the container C having the predetermined shape holding therein the erosive liquid as the content liquid. At this time, since the inner surface of the preform PF is coated with the coating layer S, the pressurized liquid L supplied into the preform PF is prevented from contacting the inner surface of the preform PF that is made of polyethylene terephthalate. Furthermore, since the coating layer S has elongation capacity and water insolubility, the coating layer S, together with the preform PF, is stretched to always cover the entire inner surface of the preform PF or the container C without being dissolved in the pressurized liquid L at the time of liquid blow molding. This allows the coating layer S to always protect the inner surface of the preform PF or the container C that is made of polyethylene terephthalate at the time of liquid blow molding, thereby preventing the inner surface from being affected by the pressurized liquid L, namely, the erosive liquid. Accordingly, the occurrence of cloudiness (opaqueness) in the container C after molding is prevented, and transparency of the container C after molding is maintained.

Assume, for example, a case where a coating having water solubility is adopted as the coating layer. In this case, the coating layer ends up being dissolved by the pressurized liquid supplied into the preform at the time of liquid blow molding, and the coating layer cannot fully protect the inner surface of the preform against the erosive liquid when the erosive liquid is used as the pressurized liquid L. Assume, for example, another case where a hard coating, such as diamond-like carbon, that does not have enough elongation capacity is adopted as the coating layer. In this case, the coating layer cannot be stretched together with the preform at the time of liquid blow molding, and a lot of portions of the inner surface of the preform or the container remain uncoated with the coating layer, and the coating layer cannot fully protect the inner surface of the preform against the erosive liquid when the erosive liquid is used as the pressurized liquid L. These cases therefore involve the occurrence of cloudiness on the inner surface of the container and the degradation of transparency of the container.

In contrast, according to the present disclosure, the inner surface of the preform PF is coated with the coating layer S having elongation capacity and water insolubility. Accordingly, even when the erosive liquid is used as the pressurized liquid L, it is ensured that the inner surface of the preform PF that is made of polyethylene terephthalate is protected against the erosive liquid, and the occurrence of cloudiness on the inner surface of the container C after molding and the degradation of transparency of the container C are prevented.

Needless to say, the present disclosure is not limited to the above embodiment, and various changes may be made without departing the gist of the present disclosure.

For example, although in the above embodiment the preform PF and the container C are preferably transparent, the preform PF and the container C only need to have transparency and may be colored in a predetermined color. In this case also, the present disclosure reduces the occurrence of cloudiness (opaqueness) due to formation of fine unevenness on the inner surface of the container C and maintains transparency of the colored container C, even when the aforementioned erosive liquid is used as the pressurized liquid L supplied to the preform PF.

Furthermore, a blow molding apparatus used to liquid blow mold the preform PF is not limited to the liquid blow molding apparatus 1 with the configuration illustrated in FIGS. 1 and 2, and blow molding apparatuses with a variety of configurations may be used.

Moreover, in the above embodiment, the coating layer S preferably has transparency or preferably gains transparency when the coating layer S, together with the preform PF, is stretched at the time of molding the preform PF into the container, although not having transparency in the state where the coating layer S is disposed on the inner surface of the preform PF. However, the present disclosure is not limited to the above embodiment, and a coating layer that does not have transparency even after being stretched together with the preform PF, that is, after the container C is molded, may also be used as the coating layer S.

Moreover, although in the above embodiment the entire inner surface of the preform PF is coated with the coating layer S, at least merely a portion of the inner surface that corresponds to the trunk PFb of the preform PF may be coated with the coating layer S.

REFERENCE SIGNS LIST

1 Liquid blow molding apparatus
11 Blow molding mold
12 Cavity
13 Nozzle unit
14 Main body block
15 Blow nozzle
15a Nozzle main body
15b Supporting portion
15c Closing surface
16 Sealing body
17 Supply path
18 Pipe
19 Pressurized liquid supply unit
20 Seal pin
20a Tapered surface
21 Stretching rod
PF Preform
PFa Mouth
PFb Trunk
S Coating layer
L Pressurized liquid (erosive liquid)
C Container

The invention claimed is:

1. A method of producing a container, comprising:
a preform molding step of molding a preform in which at least an inner surface is made of polyester and which has transparency;
a coating step of coating the inner surface of the preform with a coating layer having elongation capacity and water insolubility; and
a liquid blow molding step of molding the preform into the container having a predetermined shape by supplying a pressurized liquid into the preform in which the inner surface is coated with the coating layer, wherein in the liquid blow molding step, an erosive liquid is used as the pressurized liquid, and wherein the erosive liquid contains a component at greater than or equal to a predetermined percentage by weight concentration so as to erode, polyester and cause cloudiness on a polyester surface,
wherein the coating step is performed after the preform molding step, and the inner surface of the preform formed in the preform molding step is coated with the coating layer in the coating step.

2. The method according to claim 1 of producing a container, wherein the preform is made of polyethylene terephthalate.

3. The method according to claim 1 of producing a container, wherein the coating layer is made of polyvinyl butyral.

4. The method according to claim 1 of producing a container, wherein the coating layer is made of polyvinylidene chloride.

5. The method according to claim 2 of producing a container, wherein the coating layer is made of polyvinyl butyral.

6. The method according to claim 2 of producing a container, wherein the coating layer is made of polyvinylidene chloride.

7. The method according to claim 1 of producing a container, wherein the component of the erosive liquid is an alkaline component.

\* \* \* \* \*